US007535349B2

(12) United States Patent
Shneyder et al.

(10) Patent No.: US 7,535,349 B2
(45) Date of Patent: May 19, 2009

(54) DETERMINING ROOT CAUSE FOR ALARM IN PROCESSING SYSTEM

(75) Inventors: Dmitriy Shneyder, Hopewell Junction, NY (US); Stephen W. Goodrich, South Burlington, VT (US); Joseph J. Mezzapelle, Wappingers Falls, NY (US); Lin Zhou, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 11/608,422

(22) Filed: Dec. 8, 2006

(65) Prior Publication Data

US 2008/0140225 A1 Jun. 12, 2008

(51) Int. Cl.
*G08B 29/00* (2006.01)

(52) U.S. Cl. .............. 340/506; 340/521; 702/185; 714/25

(58) Field of Classification Search ........... 340/506, 340/521, 522, 825.36, 825.49; 324/512; 714/2, 25, 26, 48; 702/121, 179, 185; 709/224, 709/225
See application file for complete search history.

(56) References Cited

U.S. PATENT DOCUMENTS

| 5,892,440 | A  | * | 4/1999  | Bryan ................... 340/506 |
| 6,505,145 | B1 | * | 1/2003  | Bjornson ................ 702/185 |
| 6,707,795 | B1 | * | 3/2004  | Noorhosseini et al. ...... 714/796 |
| 6,728,660 | B2 | * | 4/2004  | Bjornson ................ 702/185 |
| 6,941,362 | B2 | * | 9/2005  | Barkai et al. ............ 709/224 |
| 7,176,792 | B2 | * | 2/2007  | Pereira et al. ........... 340/506 |
| 7,257,744 | B2 | * | 8/2007  | Sabet et al. ............. 714/25 |
| 7,340,374 | B2 | * | 3/2008  | Archie et al. ............ 702/121 |
| 7,386,764 | B2 | * | 6/2008  | LeDuc et al. ............ 714/2 |
| 7,412,448 | B2 | * | 8/2008  | Agarwal et al. .......... 707/10 |

OTHER PUBLICATIONS

Archie et al., "Determining Fleet Matching Problem and Root Cause Issue for Measurement System," International Business Machines Corporation, U.S. Appl. No. 11/065,740, Feb. 25, 2005, pp. 1-33.
Archie et al., "Determining Root Cause of Matching Problem and/or Fleet Measurement Precision Problem for Measurement System," International Business Machines Corporation, U.S. Appl. No. 11/245,865, Oct. 7, 2005, pp. 1-48.

* cited by examiner

*Primary Examiner*—John A Tweel, Jr.
(74) *Attorney, Agent, or Firm*—Lisa Jaklitsch; Hoffman Warnick LLC

(57) ABSTRACT

A method, system and computer program product for controlling a processing system are disclosed. Alarms and information regarding operating components within the processing system are collected by a knowledge base and are related to one another therein. Data in the knowledge base is then analyzed to determine a root cause for the alarms.

8 Claims, 3 Drawing Sheets

DETERMINING ROOT CAUSE FOR ALARM IN PROCESSING SYSTEM

FIELD OF THE INVENTION

The present invention relates in general to controlling a processing system, and more particularly to determining a root cause of alarms generated in a processing system and responding to such a root cause.

BACKGROUND OF THE INVENTION

In a microelectronics manufacturing process, a semiconductor wafer is processed through a series of tools, which form lithographic patterns, deposit films, implant dopants, and/or measure physical and/or electrical characteristics of the formed structures. Such processing procedures have broad industrial applications, including but not limited to, semiconductors, flat-panel displays, MEMS (Micro-Electro-Mechanical Systems), and disk heads.

Generally, each tool is operated by a program, hereafter referred to as a "recipe", which contains all conditions and instructions necessary to process a wafer. For example, a typical lithography recipe may contain information about the location of exposure fields, alignment strategies, and dosages. A typical Reactive Ion Etch (RIE) recipe may contain information about gas flow rates and etch times. A typical metrology recipe may contain information about locations of targets to be sampled, data acquisition conditions, and desired analyses. As tools become more and more advanced, they require more complicated quality recipes that are out of the reach of average users. In addition, as the technology size/node decreases, recipe complexity and the number of recipes increase exponentially. As a consequence, many recipes are not optimized as required.

As a wafer moves through a manufacturing process, in addition to the aforementioned recipe failures, machine/hardware/tool failures may also occur. As equipment becomes more sophisticated, there are more chances that something may go wrong without being detected. Failures that occur during an actual processing may lead to yield degradation, while failures that occur during a test may increase the time needed to build a fully functioning chip, and may provide faulty feedbacks to processing sectors, which in turn may lead to yield degradation.

In a real system, a broad category of failures may be generated by various parts of the system. For example, in the Semiconductor Industry, the Semiconductor Equipment and Materials International, Inc (SEMI) standards dictate that a broad category of failures, known as S5F1 messages, hereafter also referred to as alarms, are to be sent to the host. Hundreds to thousands of these alarms may be generated by a single tool each week. In a processing system with hundreds of tools and tens of thousands of recipes, it is important to have the capability to analyze the entire volume of alarms, to separate the important alarms from noise, and to identify areas for improvements for each toolset. The state-of-the-art technologies do not provide a satisfactory solution to this problem.

Based on the above, there is a need in the art to determine a root cause for alarms generated in a processing system.

SUMMARY OF THE INVENTION

A method, system and computer program product for controlling a processing system are disclosed. Alarms and information regarding operating components within the processing system are collected by a knowledge base and are related to one another therein. Data in the knowledge base is then analyzed to determine a root cause for the alarms.

A first aspect of the invention is directed to a method for controlling a processing system, the method comprising: collecting alarms from multiple operating units of the processing system, each operating unit including multiple operating components; relating each alarm with respective operating components in a knowledge base; analyzing data in the knowledge base to identify a root cause for an alarm; and controlling the processing system based on the identified root cause.

A second aspect of the invention is directed to a system for controlling a processing system, the system comprising: means for collecting alarms from multiple operating units of the processing system, each operating unit including multiple operating components; means for relating each alarm with respective operating components in a knowledge base; means for analyzing data in the knowledge base to identify a root cause for an alarm; and means for controlling the processing system based on the identified root cause.

A third aspect of the invention is directed to a computer program product comprising: computer usable program code which, when executed by a computer system, is configured to: collect alarms from multiple operating units of a processing system, each operating unit including multiple operating components; relate each alarm with respective operating components in a knowledge base; analyze data in the knowledge base to identify a root cause for an alarm; and control the processing system based on the identified root cause.

A fourth aspect of the invention is directed to a method of generating a system for controlling a processing system, the method comprising: providing a computer infrastructure operable to: collect alarms from multiple operating units of the processing system, each operating unit including multiple operating components; relate each alarm with respective operating components in a knowledge base; analyze data in the knowledge base to identify a root cause for an alarm; and control the processing system based on the identified root cause.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

The embodiments of this invention will be described in detail, with reference to the following figures, wherein like designations denote like elements, and wherein.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

1. System Overview

Figure 1:
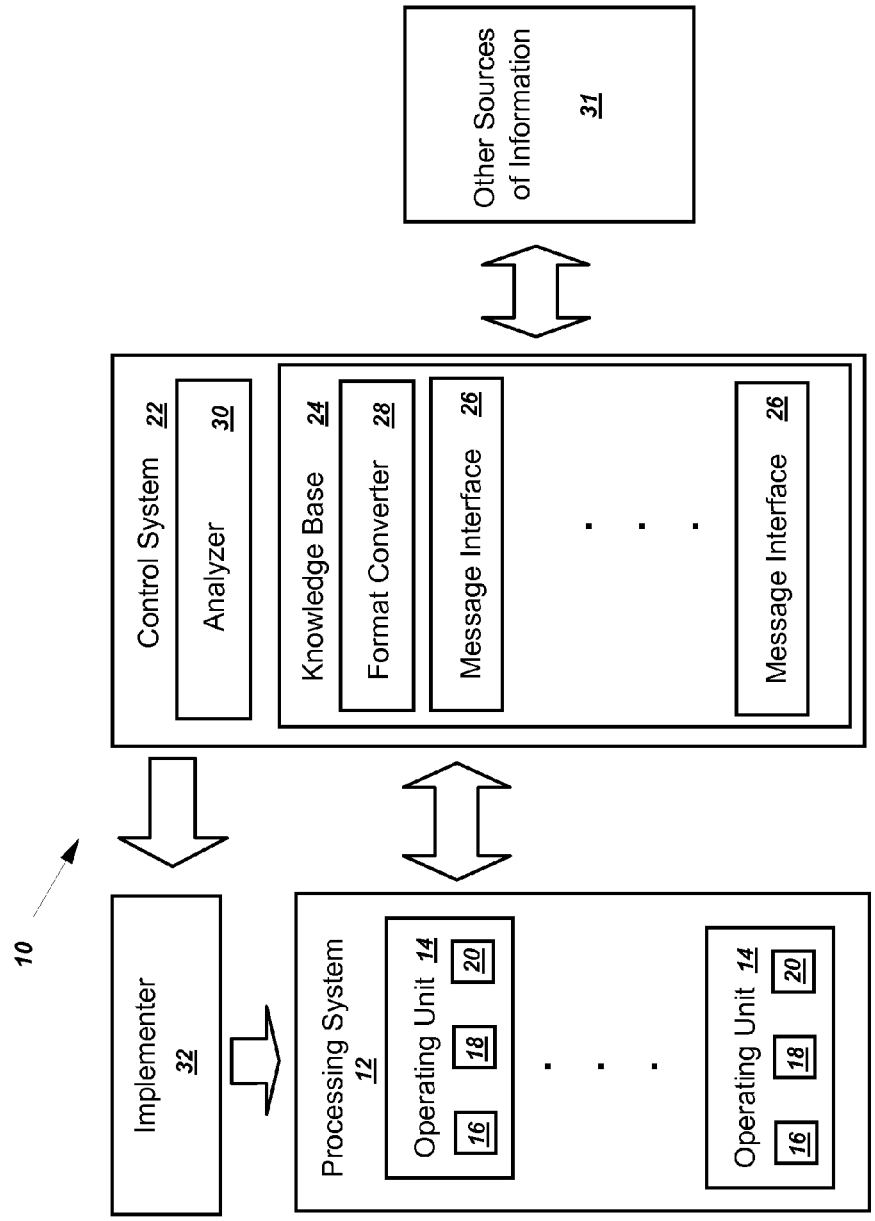
FIG. 1 shows a block diagram of a system according to one embodiment of the invention.

FIG. 1 shows a block diagram of a system 10 according to one embodiment of the invention. System 10 includes a processing system 12, e.g., a micro or nano electronics manufacturing system, including multiple operating units 14. Each operating unit 14 may include multiple operating components, e.g., hardware components 16, software components 18, and target components 20. In the case of a micro or nano electronics manufacturing system 12, for example, hardware components 16 may include a tool for processing a wafer and/or a chamber for positioning a wafer; software components 18 may include a recipe; and target components 20 may include a wafer to be processed. As is appreciated, in the case that one or more operating components (16, 18, and 20) of an operating unit 14 have problems, an alarm(s) will be generated by the operating unit 14. The specific mechanisms of generating alarms do not limit the scope of the invention. As details of the alarm generating mechanisms are not required for an understanding of the invention, no further details will be provided.

Each alarm will be sent to/collected by a knowledge base 24 of control system 22. Specifically, knowledge base 24 includes a message interface 26 customized for each operating unit 14. Message interface 26 functions to collect all information regarding, among others, an operating unit 14, for example, specifics regarding its operating components. To this extent, message interface 26 may also collect information from other sources of information 31, such as from equipment providers or recipe designers. Knowledge base 24 may also include a format converter 28 that functions to convert the various formats of messages from/for operating units 14 into a same/standardized format so that they can be easily identified and used in knowledge base 24. According to one embodiment, alarms from all operating units 14 are in the same format, e.g., S5F1 message under the SEMI standards of the Semiconductor Industry.

Within knowledge base 24, information is organized by, for example, tables to establish associations. Specifically, information in knowledge base 24 is associated such that each alarm is related to the respective operating components (16, 18, 20) under which the alarm is generated. Alarm information and the associated operating component information in knowledge base 24 is communicated to/collected by analyzer 30 of control system 22. Analyzer 30 analyzes the information and identifies root causes for the alarms. For example, analyzing alarms generated from a specific operating unit 14, analyzer 30 may identify whether the root cause is the recipe failure or the tool failure. The identified root causes may be communicated to an implementer 32 to take actions accordingly. For example, in the case that a tool is identified as problematic, implementer 32 may stop using the tool and have it examined. Implementer 32 may be an operator of an operating unit 14 or may be an automatic machine working under the control of, e.g., control system 22. In addition, knowledge base 24 may be updated with the identified root cause. For example, the identified root cause, the type of error/failure, the type of operating components 16, 18, 20, and the alarms may be associated in knowledge base 24. According to one embodiment, control system 22 and/or implementer 32 may be implemented by a computer system 100 (FIG. 2), as will be described later.

2. Computer System

Figure 2:
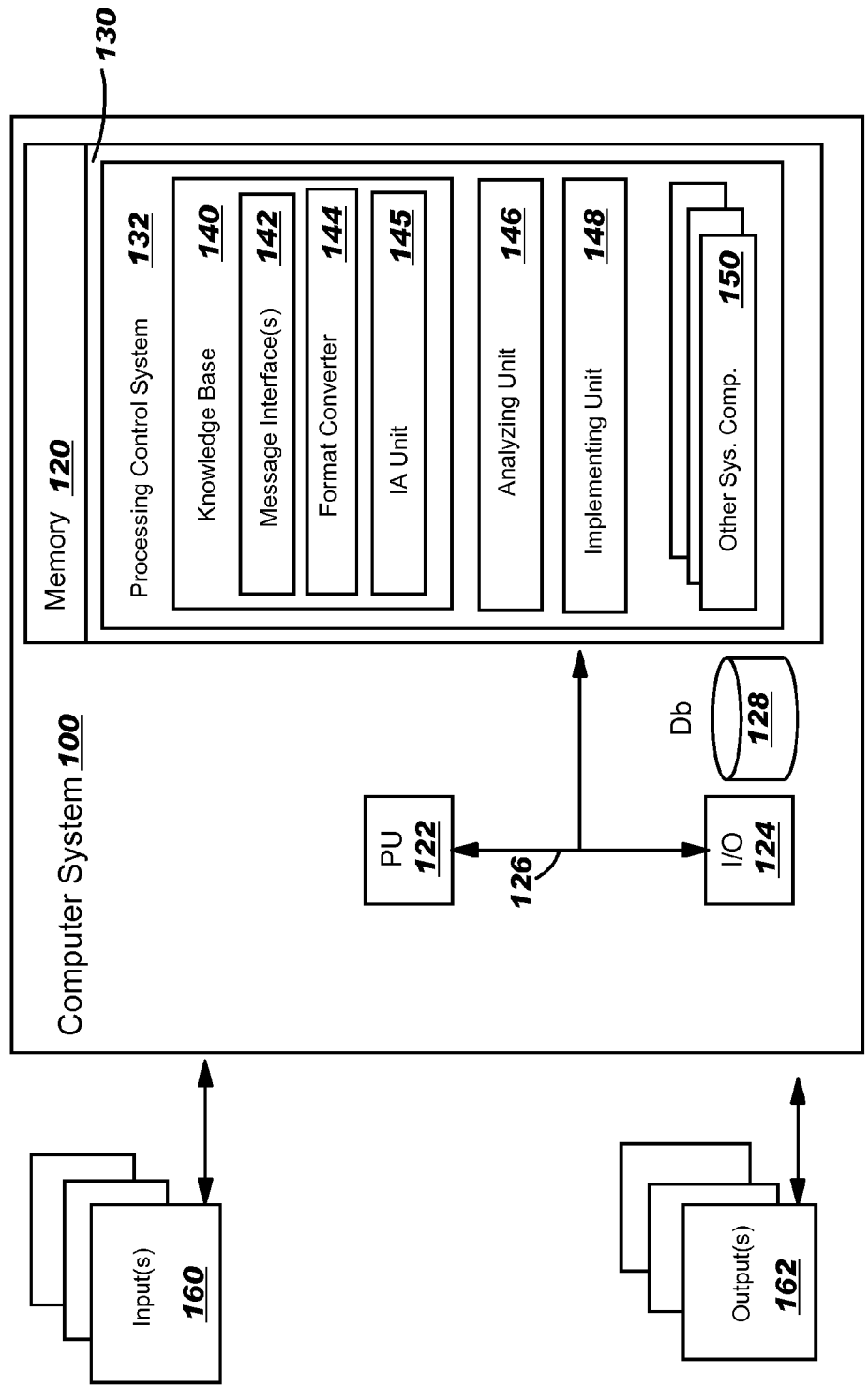
FIG. 2 shows a block diagram of an illustrative computer system according to one embodiment of the invention

Referring to FIG. 2, a block diagram of an illustrative computer system 100 according to one embodiment of the invention is shown. In one embodiment, computer system 100 includes a memory 120, a processing unit (PU) 122, input/output devices (I/O) 124 and a bus 126. A database 128 may also be provided for storage of data relative to processing tasks. Memory 120 includes a program product 130 that, when executed by PU 122, comprises various functional capabilities described in further detail below. Memory 120 (and database 128) may comprise any known type of data storage system and/or transmission media, including magnetic media, optical media, random access memory (RAM), read only memory (ROM), a data object, etc. Moreover, memory 120 (and database 128) may reside at a single physical location comprising one or more types of data storage, or be distributed across a plurality of physical systems. PU 122 may likewise comprise a single processing unit, or a plurality of processing units distributed across one or more locations. I/O 124 may comprise any known type of input/output device including a network system, modem, keyboard, mouse, scanner, voice recognition system, CRT, printer, disc drives, etc. Additional components, such as cache memory, communication systems, system software, etc., may also be incorporated into computer system 100.

As shown in FIG. 2, program product 130 may include a processing control system 132. Processing control system 132 may include a knowledge base 140 including a message interface(s) 142, format converter 144 and information associating (IA) unit 145; an analyzing unit 146; an implementing unit 148; and other system components 150. Other system components 150 may include any now known or later developed parts of a computer system 100 not individually delineated herein, but understood by those skilled in the art.

As discussed above, processing control system 132 may function to implement control system 22 and/or implementer 32 of FIG. 1. To this extent, knowledge base 140, message interface(s) 142, format converter 144, and analyzing unit 146 may implement knowledge base 24, message interface(s) 26, format converter 28, and analyzer 30 of FIG. 1, respectively. Implementing unit 148 may function to implement or control implementer 32 of FIG. 1.

Inputs 160 to computer system 100 include, for example, alarms from processing system 12 (FIG. 1) and information from other sources of information 31 (FIG. 1) and/or a user. Those inputs may be communicated to computer system 100 through I/O 124 and may be stored in database 128. Outputs 162 of computer system 100 include, for example, alarm root cause information that may be communicated to, among others, a user or an automatically controlled machine to act accordingly, e.g., to stop the problematic operating component. The operation of processing control system 132 will be described in details below.

3. Operation Methodology

Figure 3:
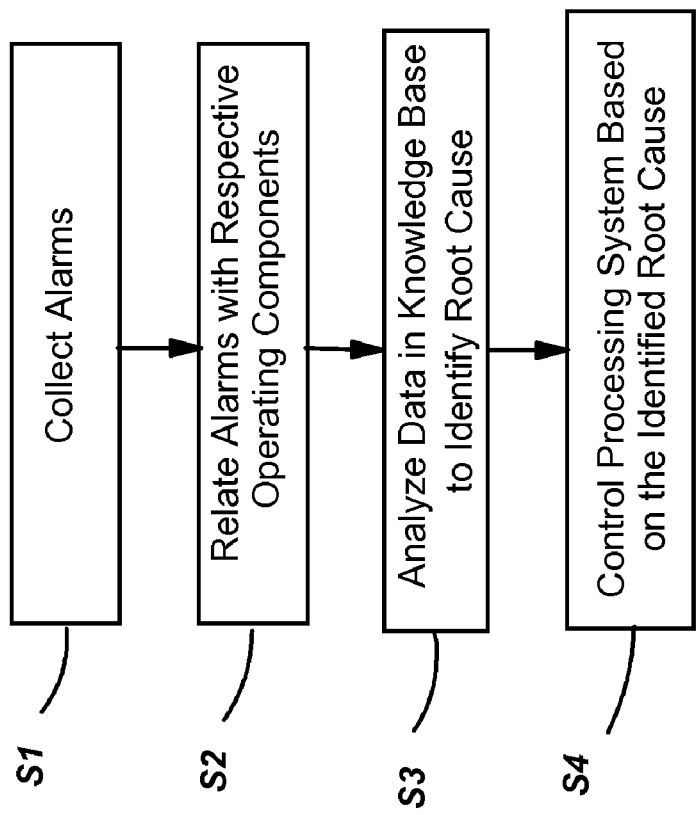
FIG. 3 shows one embodiment of the operation of a processing control system according to the invention.

Processing control system 132 functions generally to control a processing system 12 (FIG. 1) by determining a root cause of alarms so that an appropriate response can be completed. FIG. 3 shows one embodiment of the operation of processing control system 132. Referring now to FIGS. 2-3, in process S1, knowledge base 140 collects alarms from multiple operating units 14 (FIG. 1) of processing system 12 (FIG. 1). The collecting may be made by a message interface 142 customized for an operating unit 14 (FIG. 1). Message interface 142 may also collect information regarding the operating components (e.g., 16, 18 and 20 of FIG. 1) that correspond to alarms. According to one embodiment, message interfaces 142 are built under SEMI standards, which assume that all alarms are in S5F1 format. However, the invention is not limited to this, and other message formats are also possible. For example, information regarding operating components (16, 18, and 20 of FIG. 1) may be in different formats, and may be converted to S5F1 format, or any standard format accepted by message interface 142, by format converter 146.

In process S2, information associating (IA) unit 145 of knowledge base 140 relates each alarm with the respective operating components (16, 18, and 20 in FIG. 1) in knowledge base 140. Any methods of relating alarms with their respective operation components (inherently also operating units 14 as operating components are included in operation units) may be used by information associating unit 145 and all are included in the invention. According to one embodiment, tables are used to associate alarms and operating component (16, 18, 20) information (FIG. 1). As is appreciated, for different analyses of the information, different types of tables, e.g., tables of different types of information, may be required. To this extent, information associating unit 145 may only generate links to associate the information, but does not actually generate the tables.

In process S3, analyzing unit 146 analyzes data in knowledge base 140 to identify a root cause(s) for alarms. As mentioned above, information/data in knowledge base 140 are associated such that various tables may be generated to facilitate the analysis. Given that operating component (16, 18, 20) failures may illuminate themselves by the number of alarms generated by the respective operating unit 14 (FIG. 1), according to one embodiment, the number of alarms related to an operating component(s) may be used to determine a root cause of the alarms. To this extent, the numbers of alarms related to operating components (16, 18 and 20 of FIG. 1) may be normalized to make them comparable to one another. Any normalization methods may be used, and all are included in the invention. For an illustrative example, in the cases that recipe A generates 10 alarms for 20 operations and recipe B generates 12 alarms for 30 operations, the alarms per operation (APO) values may be used in the normalization such that recipe A has 0.5 APO and recipe B has 0.4 APO.

After the normalization process, analyzing unit 146 determines the contributions of operating components (16, 18, 20) to the respective alarms. According to one embodiment, the analysis focuses on the relationship between operating components (16, 18, 20) and alarms, instead of that between operating units 14 (FIG. 1) and alarms. To this extent, the analysis is not limited within the scope of an operating unit 14 (FIG. 1) because two operating units 14 may share one or more operating components (16, 18, 20). For example, if a recipe A is used by multiple operating units 14, all alarms generated by the respective operating units 14 will be analyzed in the case recipe A is examined regarding the possibility of being a root cause.

According to one embodiment, in an optional process, alarms may be initially filtered to eliminate pure noise. For example, the normalized numbers of alarms produced by all the operating units 14 (FIG. 1) may be compared, and operating units 14 that generate relative small normalized numbers of alarms will be filtered out. The respective alarms generated by the filtered out operating units 14 (FIG. 1) are also initially filtered out. As such, the analysis may be concentrated on operating units 14 (with the respective operating components 16, 18, 20) that produce relative more alarms (FIG. 1). The filtering of alarms is initial because the filtered out alarms may be brought back later for further analysis. For example, if operating unit A (14) including operating component B (16, 18, 20)(FIG. 1) does not generate a lot of alarms, all the alarms of operation unit A may be initially filtered out. If operating component B is also included in other operating units 14 (that, e.g., generate relatively large normalized numbers of alarms) and is later suspected as being problematic, the initially filtered out alarms that are produced by operating unit A (14) will be brought back for further analysis because they are related to operating component B. As should be appreciated, such initial filtering is not always necessary or preferable. The selection of such filtering may be based on the consideration of computation resources and the analysis techniques used.

Any methods may be used to determine a contribution of an operating component to alarms. For example, analyzing unit 146 may statistically correlate an operating component (16, 18, 20) of an operating unit 14 (FIG. 1) with alarms. Statistic analysis techniques such as correlation, regression, logistic correlation, logistic regression, simple standard deviation analysis, charts, etc, may all be used. As alarms are generated by an operating unit 14, the operating components (16, 18, 20) of the operating unit 14 (FIG. 1) may confound one another in producing alarms, and analyzing unit 146 needs to isolate the confounding factors to determine the actual contribution of an operating component (16, 18, 20)(FIG. 1) to alarms. The term "confound" is used for the meanings in statistics. For an illustrative example, if operating unit A with tool A and recipe A produces a lot alarms, while operating unit B with tool A and recipe B does not, it may tend to show that it is recipe A instead of tool A that causes the alarm of operating unit A. As should be appreciated, the analysis of analyzing unit 146 may be performed by the machine automatically or may be performed by a user interacting with the machine.

In process S4, implementing unit 148 controls implementer 32 (FIG. 1) to control processing system 12 based on the identified root cause. It should be appreciated that implementing unit 148 and implementer 32 may be an integrated part or may be separated and located in separated locations. As mentioned above, implementer 32 (FIG. 1) may be an operator or an automatic controlled machine. To this extent, implementing unit 148 may function to communicate the root cause information to the operator for the operator to act accordingly or may control the machine to act automatically. According to one embodiment, based on information/instruction from implementing unit 148, implementer 32 may stop the operating component (16, 18 and 20) to avoid problems and for further examination (FIG. 1).

4. Conclusion

While shown and described herein as a method and system for controlling a processing system, it is understood that the invention further provides various alternative embodiments. For example, in one embodiment, the invention provides a program product stored on a computer-readable medium, which when executed, enables a computer infrastructure to control a processing system. To this extent, the computer-readable medium includes program code, such as processing control system 132 (FIG. 2), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 120 (FIG. 2) and/or database 128 (FIG. 2), and/or as a data signal traveling over a network (e.g., during a wired/wireless electronic distribution of the program product).

In another embodiment, the invention provides a method of generating a system for controlling a processing system. In this case, a computer infrastructure, such as computer system 100 (FIG. 2), can be obtained (e.g., created, maintained, having been made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing system 100 (FIG. 2), from a computer-readable medium; (2) adding one or more computing devices to the computer infrastructure; and (3) incorporating and/or modifying one or more existing systems of the computer infrastructure to enable the computer infrastructure to perform the process steps of the invention.

In still another embodiment, the invention provides a business method that performs the process described herein on a subscription, advertising supported, and/or fee basis. That is, a service provider could offer to control a processing system as described herein. In this case, the service provider can manage (e.g., create, maintain, support, etc.) a computer infrastructure, such as computer system 100 (FIG. 2), that performs the process described herein for one or more customers and communicates the results to the one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for controlling a processing system, the method comprising:
   collecting alarms from multiple operating units of the processing system, each operating unit including multiple operating components;
   relating each alarm with respective operating components in a knowledge base;
   analyzing data in the knowledge base to identify a root cause for an alarm; and
   controlling the processing system based on the identified root cause;
   wherein the multiple operating components include at least one of a hardware component, a software component, and a target component, and wherein the analyzing includes statistically correlating an alarm with an operating component;
   wherein the analyzing includes normalizing a number of alarms related to an operating component of an operating unit; and
   wherein the alarms are in a same format.

2. The method of claim 1, wherein the multiple operating components include at least one of a recipe, a tool, a chamber, and a wafer in a microelectronics processing.

3. A system for controlling a processing system, the system comprising:
   means for collecting alarms from multiple operating units of the processing system, each operating unit including multiple operating components;
   means for relating each alarm with respective operating components in a knowledge base;
   means for analyzing data in the knowledge base to identify a root cause for an alarm; and
   means for controlling the processing system based on the identified root cause;
   wherein the multiple operating components include at least one of a hardware component, a software component, and a target component, and wherein the analyzing includes statistically correlating an alarm with an operating component;
   wherein the analyzing means further normalizes a number of alarms related to an operating component; and
   wherein the alarms are in a same format.

4. The system of claim 3, wherein the multiple operating components include at least one of a recipe, a tool, a chamber, and a wafer in a microelectronics processing.

5. A computer readable storage medium comprising:
computer usable program code which, when executed by a computer system, is configured to:
collect alarms from multiple operating units of a processing system, each operating unit including multiple operating components;
relate each alarm with respective operating components in a knowledge base;
analyze data in the knowledge base to identify a root cause for an alarm; and
control the processing system based on the identified root cause;
wherein the multiple operating components include at least one of a hardware component, a software component, and a target component, and wherein the analyzing includes statistically correlating an alarm with an operating component;
wherein the computer usable program code is fun her configured to normalize a number of alarms related to an operating component; and
wherein the alarms are in a same format.

6. The program product of claim 5, wherein the multiple operating components include at least one of a recipe, a tool, a chamber, and a wafer in a microelectronics processing.

7. A method of generating a system for controlling a processing system, the method comprising:
providing a computer infrastructure operable to:
collect alarms from multiple operating units of the processing system, each operating unit including multiple operating components;
relate each alarm with respective operating components in a knowledge base;
analyze data in the knowledge base to identify a root cause for an alarm; and
control the processing system based on the identified root cause;
wherein the multiple operating components include at least one of a hardware component, a software component, and a target component, and wherein the analyzing includes statistically correlating an alarm with an operating component.

8. The method of claim 7, wherein the multiple operating components include at least one of a recipe, a tool, a chamber, and a wafer in a microelectronics processing, the information of which being collected by the computer infrastructure in a same format as the alarms.

* * * * *